United States Patent
Ojima et al.

(10) Patent No.: US 12,197,600 B2
(45) Date of Patent: Jan. 14, 2025

(54) INFORMATION PROCESSING APPARATUS, INFORMATION PROCESSING METHOD AND PROGRAM

(71) Applicant: NTT Communications Corporation, Tokyo (JP)

(72) Inventors: Keiko Ojima, Tokyo (JP); Hironari Takahashi, Yokohama (JP); Hiromi Kaneko, Tokyo (JP); Hiroaki Sadata, Tokyo (JP)

(73) Assignee: NTT Communications Corporation, Tokyo (JP)

( * ) Notice: Subject to any disclaimer, the term of this patent is extended or adjusted under 35 U.S.C. 154(b) by 572 days.

(21) Appl. No.: 17/275,870

(22) PCT Filed: Mar. 11, 2020

(86) PCT No.: PCT/JP2020/010529
§ 371 (c)(1),
(2) Date: Mar. 12, 2021

(87) PCT Pub. No.: WO2020/189441
PCT Pub. Date: Sep. 24, 2020

(65) Prior Publication Data
US 2022/0058277 A1 Feb. 24, 2022

(30) Foreign Application Priority Data
Mar. 15, 2019 (JP) .................. 2019-049064

(51) Int. Cl.
*H04L 9/00* (2022.01)
*G06F 21/62* (2013.01)
(Continued)

(52) U.S. Cl.
CPC ............ *G06F 21/62* (2013.01); *G06F 40/166* (2020.01); *G06F 40/279* (2020.01);
(Continued)

(58) Field of Classification Search
CPC .............................. G06F 21/62; G06F 40/279
(Continued)

(56) References Cited

U.S. PATENT DOCUMENTS 5,991,709 A * 11/1999 Schoen .................. G06Q 99/00
707/999.001
9,596,349 B1 * 3/2017 Hernandez .............. G10L 25/51
(Continued)

FOREIGN PATENT DOCUMENTS

CN  106504744 A  3/2017
JP  2001-189718 A  7/2001
(Continued)

OTHER PUBLICATIONS

International Search Report issued on Jun. 9, 2020 in PCT/JP2020/010529 filed on Mar. 11, 2020, 2 pages.
(Continued)

*Primary Examiner* — Christopher J Brown
(74) *Attorney, Agent, or Firm* — Oblon, McClelland, Maier & Neustadt, L.L.P.

(57) ABSTRACT

A technique for readily concealing confidential information contained in document data can be offered.
An information processing apparatus according to an embodiment includes: a document data acquisition part configured to acquire first document data including sentences that contain character information; a sentence separation part configured to separate the first document data into sentences; a concealment target determination part configured to determine whether or not each of the sentences included in the first document data is a concealment target, in accordance with a preset rule; a concealment processing part configured to execute a concealment process upon the sentence when the sentence is determined to be a concealment target; and an output part configured to output second (Continued)

document data including a sentence obtained by executing the concealment process by the concealment processing part.

7 Claims, 4 Drawing Sheets

(51) Int. Cl.
*G06F 40/166* (2020.01)
*G06F 40/279* (2020.01)
*G06F 40/242* (2020.01)
*G10L 15/22* (2006.01)
*G10L 15/26* (2006.01)

(52) U.S. Cl.
CPC .... *G06F 40/242* (2020.01); *G06F 2221/2113* (2013.01); *G10L 15/22* (2013.01); *G10L 15/26* (2013.01)

(58) Field of Classification Search
USPC .......................................................... 726/26
See application file for complete search history.

(56) References Cited

U.S. PATENT DOCUMENTS

| | | | | |
|---|---|---|---|---|
| 2005/0132070 A1* | 6/2005 | Redlich | ............... | G06F 21/6209 709/228 |
| 2007/0005589 A1* | 1/2007 | Gollapudi | ............. | G06F 16/313 707/E17.084 |
| 2019/0164547 A1* | 5/2019 | Yoo | ..................... | G10L 15/1815 |

FOREIGN PATENT DOCUMENTS

| | | | |
|---|---|---|---|
| JP | 2004-213376 A | 7/2004 | |
| JP | 2008-193612 A | 8/2008 | |
| JP | 2014-186425 A | 10/2014 | |
| WO | WO2020/101670 A1 * | 11/2018 | ............. G10L 15/16 |

OTHER PUBLICATIONS

NTT East News Release, "Meeting minute creation assisting system 'VoiceAir' to launch soon", Nov. 30, 2010, Internet <URL: https://www.ntt-east.co.jp/release/detail/20101130_01.html>, 4 total pages, with unedited computer generated English translation.

Hori, T. et al., "Aiming for a computer which picks up people's conversation", NTT Technical Review, Sep. 2013, Internet <http://www.ntt.co.jp/journal/1309/files/jn201309018.pdf>, 10 total pages, with unedited computer generated English translation.

NTT R&D Forum 2015, Voice collaboration V-15, "Real-time meeting speech recognition (Auto-transcription of statements in meetings enables efficient comprehension)", 2015, Internet <http://www.ntt.co.jp/RD/active/201502/jp/ap/pdf/V-15_j.pdf>, 2 total pages, with unedited computer generated English translation.

NTT Communications Corporation, News Release, "Natural language analysis API service using world's largest Japanese dictionary of over 2.1 million entries launched in full scale", Sep. 5, 2018, https://www.ntt.com/about-us/press-releases/news/article/2018/0905.html, 8 total pages, with unedited computer generated English translation.

Japanese Office Action issued Aug. 9, 2022 in Japanese Patent Application No. 2019-049064 (with unedited computer generated English translation), 8 pages.

International Preliminary Report on Patentability and Written Opinion issued Sep. 30, 2021 in PCT/JP2020/010529, 9 pages.

Combined Chinese Office Action and Search Report issued Aug. 25, 2023 in Chinese Application 202080005003.8, (with unedited computer-generated English translation), 17 pages.

* cited by examiner

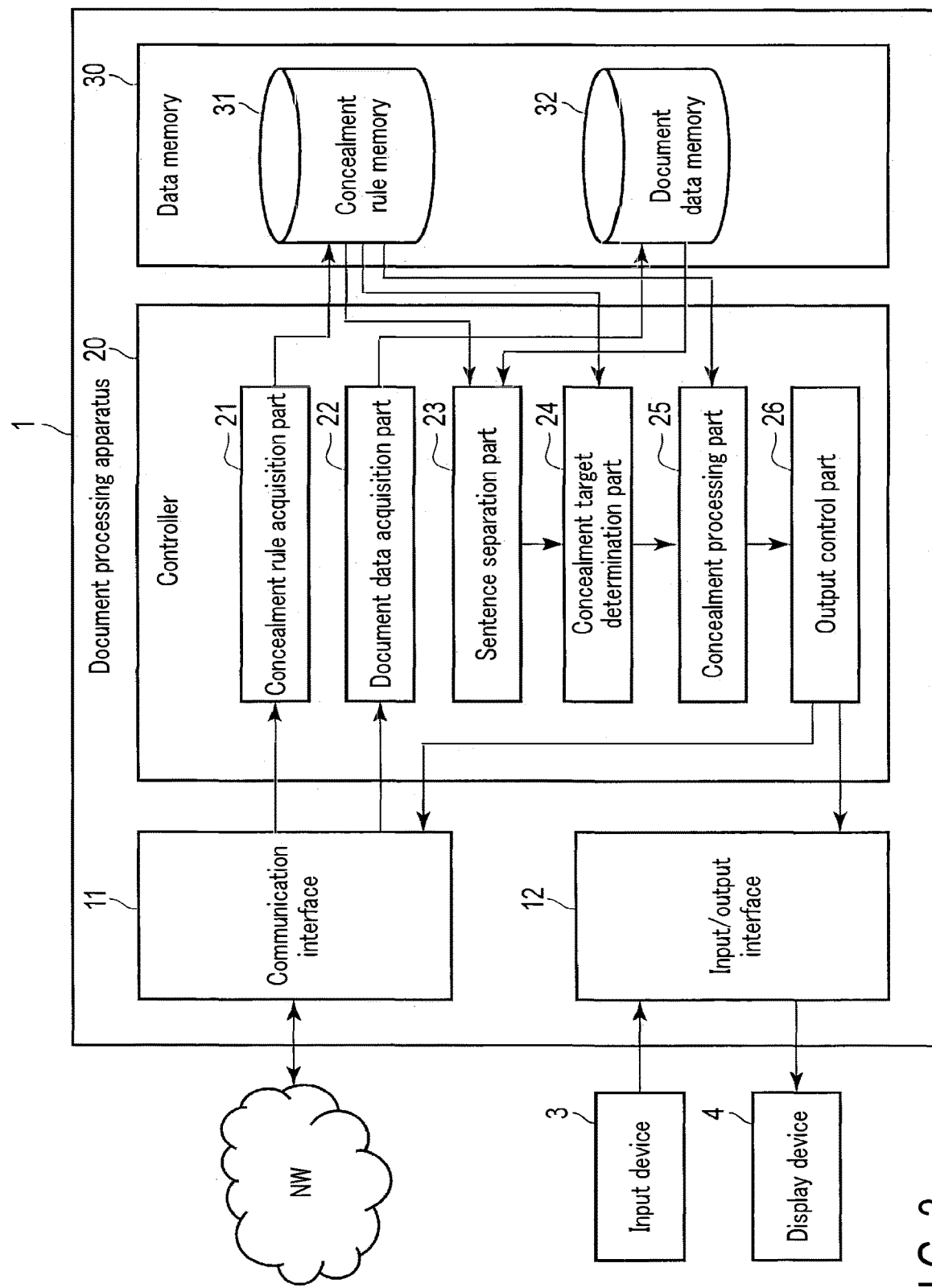
F I G. 3

INFORMATION PROCESSING APPARATUS, INFORMATION PROCESSING METHOD AND PROGRAM

CROSS-REFERENCE TO RELATED APPLICATIONS

This is a U.S. National Phase Application under 35 U.S.C. 371 of International Application PCT/JP2020/010529 (not published in English) filed Mar. 11, 2020.

FIELD

One aspect of the present invention relates to an information processing apparatus, an information processing method, and a program for processing document data.

BACKGROUND

Assistance services in document data creation, using voice recognition techniques and language analysis techniques, have been offered. For instance, a meeting minute creation assistance technique, with which voices such as utterances made during a meeting can be converted to text data using a voice recognition engine has been known (see Non-patent Literature 1, for example). A technique for attaching speaker identification information with respect to conversing voices during a meeting has also been known (see Non-patent Literatures 2 and 3, for example).

CITATION LIST

Non Patent Literatures

[Non Patent Literature 1]
NTT East News Release, "Meeting minute creation assisting system 'VoiceAir' to launch soon", Nov. 30, 2010, Internet <URL: https://www.ntt-east.co.jp/release/detail/20101130_01.html>
[Non Patent Literature 2]
Takaaki Hori et al., "Aiming for a computer which picks up people's conversation", NTT Technical Review, September 2013, Internet <http://www.ntt.co.jp/journal/1309/files/jn201309018.pdf>
[Non Patent Literature 3]
NTT R&D FORUM 2015, Voice collaboration V-15 "Real-time meeting speech recognition (Auto-transcription of statements in meetings enables efficient comprehension)", Internet <http://www.ntt.co.jp/RD/active/201502/jp/ap/pdf/V-15_j.pdf>

SUMMARY

Technical Problem

Meeting minutes often contain, by their nature, a considerable amount of confidential information. When the meeting conversation is automatically converted to text data using a voice recognition technique, the created document may contain matters that should be shared only among the participants of the meeting, or distractions unrelated to the subjects of the meeting.

If such a document is to be shared with more than one person in a browsable fashion, a cumbersome task of checking in advance any portion that should not be disclosed and deleting as appropriate is required. Furthermore, the portion of the document to be concealed may differ in accordance with job titles and sections of an office, for instance, a document for distribution to executives may differ from a document for distribution to other employees. If this is the case, different document data needs to be created for different viewer groups. This makes the task still more cumbersome.

The present invention has been conceived in light of the above circumstances. The invention aims to offer a technique for facilitating concealment of confidential information contained in document data.

Solution to Problem

To solve the above issue, the invention according to the first aspect includes: a document data acquisition part configured to acquire first document data including sentences that contain character information; a sentence separation part configured to separate the first document data into sentences; a concealment target determination part configured to determine whether or not each of the sentences included in the first document data is a concealment target, in accordance with a preset rule; a concealment processing part configured to execute a concealment process upon the sentence when the sentence is determined to be a concealment target; and an output part configured to output second document data including a sentence obtained by executing the concealment process by the concealment processing part.

According to the second aspect of the invention, the concealment target determination part determines a given sentence to be a concealment target when the sentence contains concealment target words of a predetermined number or more or in a predetermined ratio or higher.

According to the third aspect of the invention, when a given sentence is associated with a specific speaker, the concealment target determination part determines the sentence to be a concealment target.

According to the fourth aspect of the invention, when a given sentence contains an expression that indicates a need for concealment, the concealment target determination part determines sequential sentences including the sentence to be a concealment target, the sequential sentences being identified as an utterance of a speaker of the sentence.

According to the fifth aspect of the invention, the concealment target determination part determines, in accordance with the preset rule, a confidentiality level representing a degree of confidentiality for each of the sentences obtained by separating the first document data, and the concealment processing part executes a concealment process upon each of the sentences in accordance with the confidentiality level determined by the concealment target determination part, the concealment process differing in accordance with the confidentiality level.

According to the sixth aspect of the invention, the concealment processing part executes a concealment process that enables recovery for an original sentence, using keys for each of the sentences, the keys differing in accordance with the confidentiality level.

According to the seventh aspect of the invention, the concealment target determination part further determines, with respect to the sentence determined not to be a concealment target, whether or not a word contained in the sentence is a concealment target, and the concealment processing part executes a concealment process upon the word contained in the sentence if the word is a concealment target.

According to the eighth aspect of the invention, the concealment processing part executes a timed concealment process upon the sentence determined to be a concealment target.

Advantageous Effects of Invention

According to the first aspect of the present invention, a determination is made in accordance with preset rules on document data that includes sentences containing character information as to whether or not each sentence is a concealment target. When the sentence is a concealment target, a concealment process is executed upon this sentence, as a result of which document data is output. In this manner, document data for disclosure can be readily obtained by executing a suitable concealment process upon concealment target sentences, while maintaining the original character information for sentences that are not concealment targets.

According to the second aspect of the present invention, when a given sentence contains concealment target words of a certain number or more or in a certain ratio or higher, the sentence is determined to be a concealment target, and subjected to a concealment process. In this manner, document data for disclosure can be readily obtained in which a concealment process is executed for each sentence in accordance with the number or ratio of concealment target words contained in the sentence, without entailing a complex analytical process.

According to the third aspect of the present invention, when a given sentence is associated with a specific speaker, this sentence is determined to be a concealment target, and is subjected to a concealment process. In this manner, document data for disclosure can be readily obtained in which a concealment process is executed upon the matters uttered by a specific speaker who relates to confidential information such as a manager, a personnel officer, and a person in charge of engineering and development.

According to the fourth aspect of the present invention, when a given sentence contains a word or phrase that needs to be concealed, sequential sentences including this sentence and identified as being uttered by the very speaker of that sentence are determined to be a concealment target, and a concealment process is executed on these sequential sentences. In this manner, document data for disclosure can be readily obtained, without entailing a complex analytical process, by executing a concealment process upon the utterance of one speaker when a sentence contains a phrase that indicates the speaker does not intend for it to be disclosed, such as "please keep it secret" and "this is off the record".

According to the fifth aspect of the present invention, a confidentiality level representing the degree of confidentiality is determined for each of the sentences contained in the document data, and different concealment processes are executed in accordance with the determined confidentiality levels. In this manner, the speed of the processing can be enhanced and the load of the processing can be reduced suitably in accordance with the nature of viewers and documents by adopting an encrypting process of a small processing load for a sentence with a low confidentiality level, and a complex encrypting process for a sentence with a high confidentiality level.

According to the sixth aspect of the present invention, a concealment process can be executed which enables recovery to the original sentence by using different keys in accordance with different confidentiality levels for individual sentences. In this manner, with the authority determined to access a key for recovery or by controlling the key distribution, multi-level information disclosure of a single-file document data can be realized.

According to the seventh aspect of the present invention, a determination is made on a sentence determined not to be a concealment target as to whether any of the words contained in the sentences is a concealment target, and if there is a concealment target present, a concealment process is executed upon this word. In this manner, document data for disclosure can be readily obtained in which a concealment target word is suitably concealed even when appearing in a sentence that is not a concealment target.

According to the eighth aspect of the present invention, a timed concealment process is executed on a sentence determined to be a concealment target. In this manner, a suitable concealment process can be executed, for example upon a document intended for disclosure after the lapse of a predetermined period of time, without requiring separate distribution of a decryption key or a document for disclosure after this predetermined period.

According to the aspects of the invention, a technique for readily concealing confidential information in the document data can be offered.

BRIEF DESCRIPTION OF THE DRAWINGS

FIG. 3 is a block diagram showing a software configuration of the document processing apparatus according to the embodiment of the present invention.

DETAILED DESCRIPTION

Embodiments of the present invention will be described below with reference to the drawings.

Figure 1:
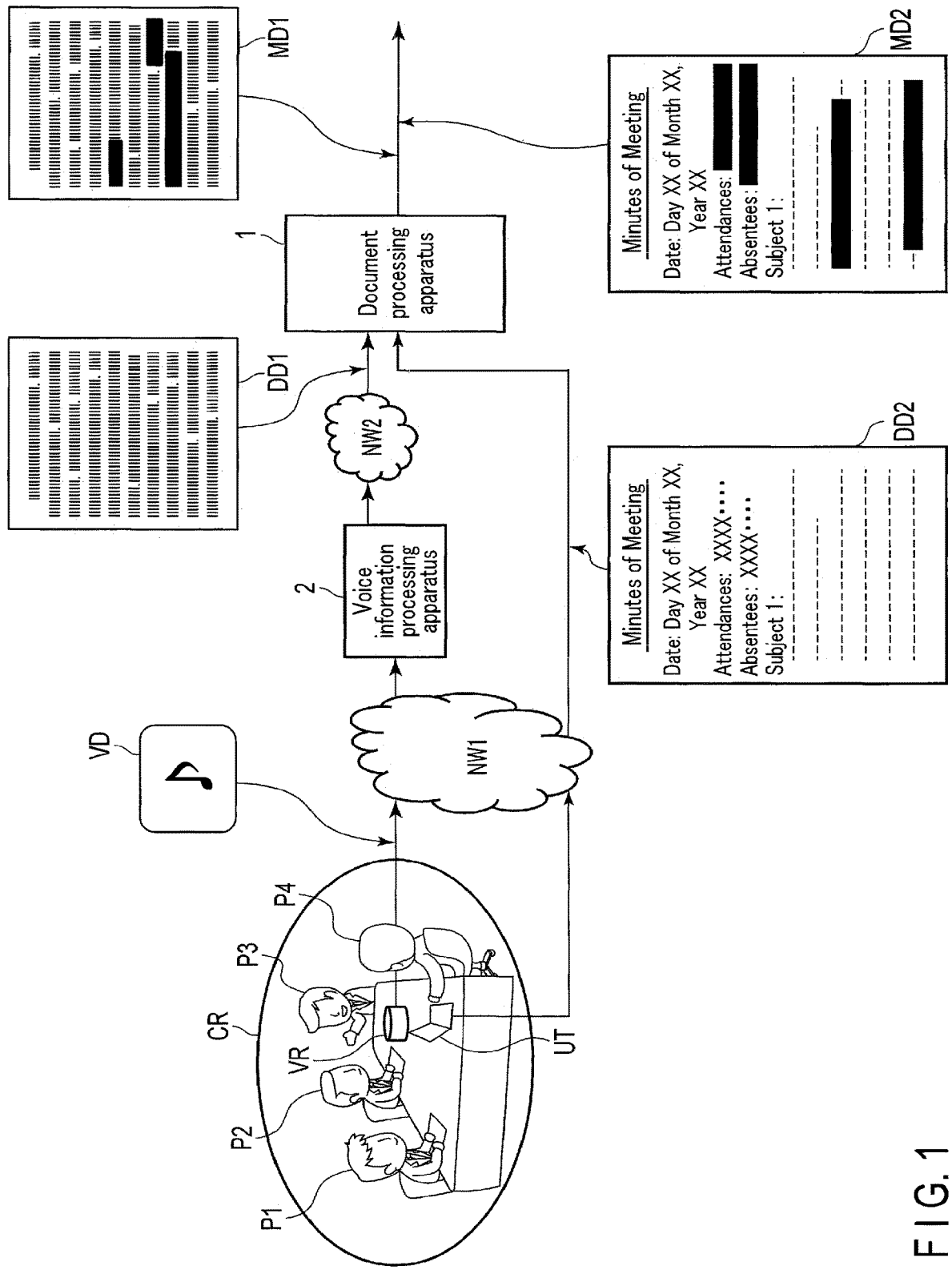
FIG. 1 is a diagram showing the entire configuration of a system including a document processing apparatus according to the first embodiment of the present invention.

First Embodiment (Structure)
(1) System
FIG. 1 is a diagram showing an example of the entire configuration of a system including a document processing apparatus 1, which serves as an information processing apparatus according to the first embodiment of the present invention.

This system may have the document processing apparatus 1 on the Web or on a cloud. The system enables the document processing apparatus 1 to communicate with a voice information collection device VR configured to collect voices from a meeting room CR and output voice data; a voice information processing apparatus 2 configured to convert the voice data to document data; and a user terminal UT configured to output the document data, through networks NW1 and NW2.

The communication networks NW1 and NW2 (which hereinafter may be referred to as "communication networks NW" without differentiating between them) may be the same network or different networks, and include a junction network and multiple access networks for accessing this junction network. As a junction network, a public network that is commonly used such as the Internet, or a closed network that is controlled in a manner such that access can be made only from limited devices, may be adopted. As an access network, a wireless local area network (wireless LAN), cell phone network, wired telephone network, Fiber To The Home (FTTH) network, cable television (CATV) network and the like may be adopted.

The voice information collection device VR mounted in the meeting room CR, such as a microphone or voice recorder, collects utterances of meeting participants P1, P2, P3, P4, . . . (which hereinafter may be referred to as "meeting participants P" without differentiating between them) as voice information, generates voice data VD which it transmits to the voice information processing apparatus 2 through the communication network NW1.

The voice information processing apparatus 2 can be any device provided on the Web or on a cloud, and is configured to convert the voice information to character information (text information) using a prestored language dictionary or the like. The voice information processing apparatus 2 may utilize a language analysis service using a voice recognition AI (see NTT Communications Corporation, News Release, "Natural language analysis API service using world's largest Japanese dictionary of over 2.1 million entries launched in full scale", Sep. 5, 2018, https://www.ntt.com/about-us/press-releases/news/article/2018/0905.html). The voice information processing apparatus 2 executes a process of receiving voice data VD transmitted by the voice information collection device VR through the communication network NW1, converting the voice information contained in the voice data VD to character information, generating document data DD1 including character information, and transmitting the resultant data to the document processing apparatus 1 through the communication network NW2.

The document processing apparatus 1 receives the document data DD1 transmitted by the voice information processing apparatus 2, executes a necessary concealment process upon the received document data DD1, and generates and outputs the processed document data MD1 subjected to concealment processes such as masking and encrypting.

Alternatively, the document processing apparatus 1 may execute a process based on document data DD2 created by a meeting participant P on a user terminal UT such as a personal computer. The document data DD2 may be in any data format that includes character information. The character information includes characters, symbols, character strings, symbol strings, sentences, passages and the like, which may be referred to below as "text" or "text information" In addition to the character information, the document data DD2 may also include layout information indicating headings and paragraphs, image information including shapes, charts and snapshots, or video information.

The document processing apparatus 1 is configured to receive the document data DD2 transmitted by the user terminal UT, for example through the communication network NW1, and execute a necessary concealment process to generate and output the processed document data MD2 subjected to concealment processes such as masking and encrypting.

As described above, the document processing apparatus 1 according to the present embodiment receives document data DD1 or DD2 (hereinafter referred to as "document data DD" without differentiating between them) as first document data, executes a concealment process upon the document data DD, and outputs the processed document data MD1 or MD2 (hereinafter referred to as "processed document data MD" without differentiating between them) as second document data. The processed document data MD has been processed in a manner such that a concealment target portion is non-browsable. In the example of FIG. 1, the processed document data MD includes blackened portions to mask the portions determined to be a concealment process target, such as individual names of attendants and absentees. The concealment process executed by the document processing apparatus 1 is not limited to such masking, but any processes can be adopted, including various encryption schemes, replacement with general terms, conversion to symbol strings, and deletion of the target portions. The concealment process may be a recoverable or unrecoverable process in relation to the original document data.

(2) Document Processing Apparatus (2-1) Hardware Configuration

Figure 2:
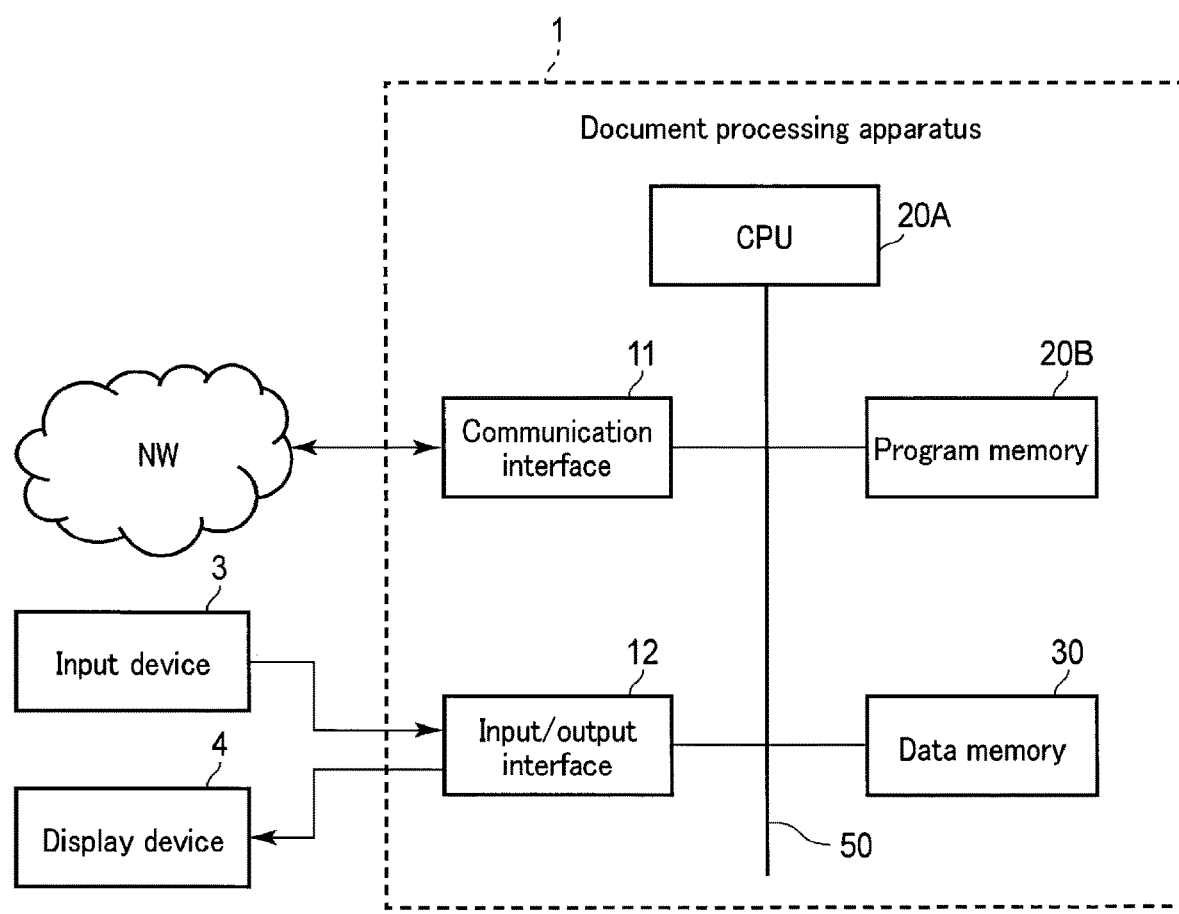
FIG. 2 is a block diagram showing a hardware configuration of the document processing apparatus according to the embodiment of the present invention.

FIG. 2 is a block diagram showing an exemplary hardware configuration of the document processing apparatus 1 according to the present embodiment of the invention.

The document processing apparatus 1 may be constituted by a server computer or a personal computer, which includes a hardware processor 20A such as a central processing unit (CPU). This hardware processor is coupled to a program memory 20B, a data memory 30, a communication interface 11, and an input/output interface 12 by way of a bus 50.

The input/output interface 12 is coupled to an input device 3 and a display device 4 that are attached to the document processing apparatus 1. The input/output interface 12 executes a process of capturing operational data input by an operator on the input device 3 such as a keyboard, a touch panel and a mouse, and outputting and displaying the display data onto the display device 4 utilizing liquid crystal or organic electroluminescence (EL). For the input device 3 and display device 4, devices incorporated within the document processing apparatus 1 may be adopted, or an input device and display device of a different information terminal that is communicable through a communication network NW may be adopted.

The communication interface 11 may include one or more wired or wireless communication interface units so that information can be transmitted to and received from external devices. As a wired interface, a wired LAN may be employed. As a wireless interface, an interface adopting a low-power wireless data communication standard such as a wireless LAN or Bluetooth (registered trademark) may be employed. The communication interface 11 performs data transmission with a user terminal UT and the voice information processing apparatus 2 in accordance with a communication protocol defined by the communication networks NW.

The program memory 20B serves as a storage medium and may be a combination of a nonvolatile memory such as a hard disk drive (HDD) or solid state drive (SSD), in which writing and reading can be conducted at any time, and a nonvolatile memory such as a ROM. Programs necessary to execute various types of control processing according to the embodiment are stored in the program memory 20B.

The data memory 30 serves as a storage medium and may be a combination of a nonvolatile memory such as an HDD or SSD, in which writing and reading can be conducted at any time, and a volatile memory such as a random access memory (RAM). The data memory 30 is used to store data of various types acquired and generated during the process.

(2-2) Software Configuration

FIG. 3 is a block diagram showing the software configuration of the document processing apparatus 1 according to the present embodiment of the invention, in association with the hardware configuration of FIG. 2.

In a memory area of the data memory 30, a concealment rule memory 31 and a document data memory 32 are provided.

The concealment rule memory 31 is adopted for storing rules that are preset in relation to the concealment processes.

The document data memory 32 is adopted for storing the process target document data.

The memories 31 and 32, however, are not essential components. For instance, they may be arranged in an external memory medium such as a USB memory or a memory device such as a cloud database server.

The controller 20 is constituted by the aforementioned hardware processor 20A and program memory 20B. The controller 20 includes, as software processing functions, a concealment rule acquisition part 21, a document data acquisition part 22, a sentence separation part 23, a concealment target determination part 24, a concealment processing part 25, and an output control part 26. These processing function parts can be realized by the hardware processor 20A implementing the programs stored in the program memory 20B. The controller 20 may be implemented in various other forms including an integrated circuit such as an application specific integrated circuit (ASIC) or a field-programmable gate array (FPGA).

The concealment rule acquisition part 21 executes a process of acquiring preset concealment rules from a server or the like on the network through the communication interface 11 and storing them in the concealment rule memory 31. The concealment rules may include various rules relating to the process for concealing confidential information. For instance, the concealment rules may include a definition of a sentence as a unit of document data separation, criteria to determine whether a specific sentence is a concealment target, criteria to determine whether a specific word is a concealment target, criteria relating to a degree of confidentiality of the sentence or word that is a concealment target, and information designating a concealment processing method. The concealment rule acquisition part 21 is not an essential component, and the concealment rules may be prestored in the concealment rule memory 31.

The document data acquisition part 22 executes a process of acquiring the processing target document data DD from the voice information processing apparatus 2 or user terminal UT through the communication interface 11 and storing the document data DD into the document data memory 32.

The sentence separation part 23 executes a process of reading the document data DD from the document data memory 32 and separating the character information contained in the document data DD into sentences which serve as units of concealment determination in accordance with the concealment rules stored in the concealment rule memory 31. A sentence here denotes any unit of text that includes one or more words, such as a sentence ending with a punctuation symbol "○" or a period ".", a passage or paragraph including several sentences, and portions distinguishable from other text portions by size or arrangement such as titles and headings. The sentence separation part 23 may identify the punctuation symbol "○" as a sentence end marker and separate the text into sentences.

The concealment target determination part 24 executes a process of determining whether each of the sentences obtained as a result of the separation is a concealment processing target in accordance with the concealment rules stored in the concealment rule memory 31.

The concealment processing part 25 executes a process of concealing the character information contained in the document data DD in accordance with the concealment rules stored in the concealment rule memory 31.

The output control part 26 executes a process of generating the processed document data MD using the information subjected to the concealment process by the concealment processing part 25, and outputting the processed document data MD either to an external device on the network via the communication interface 11 or to the display device 4 via the input/output interface 12.

(Operations)

Figure 4:
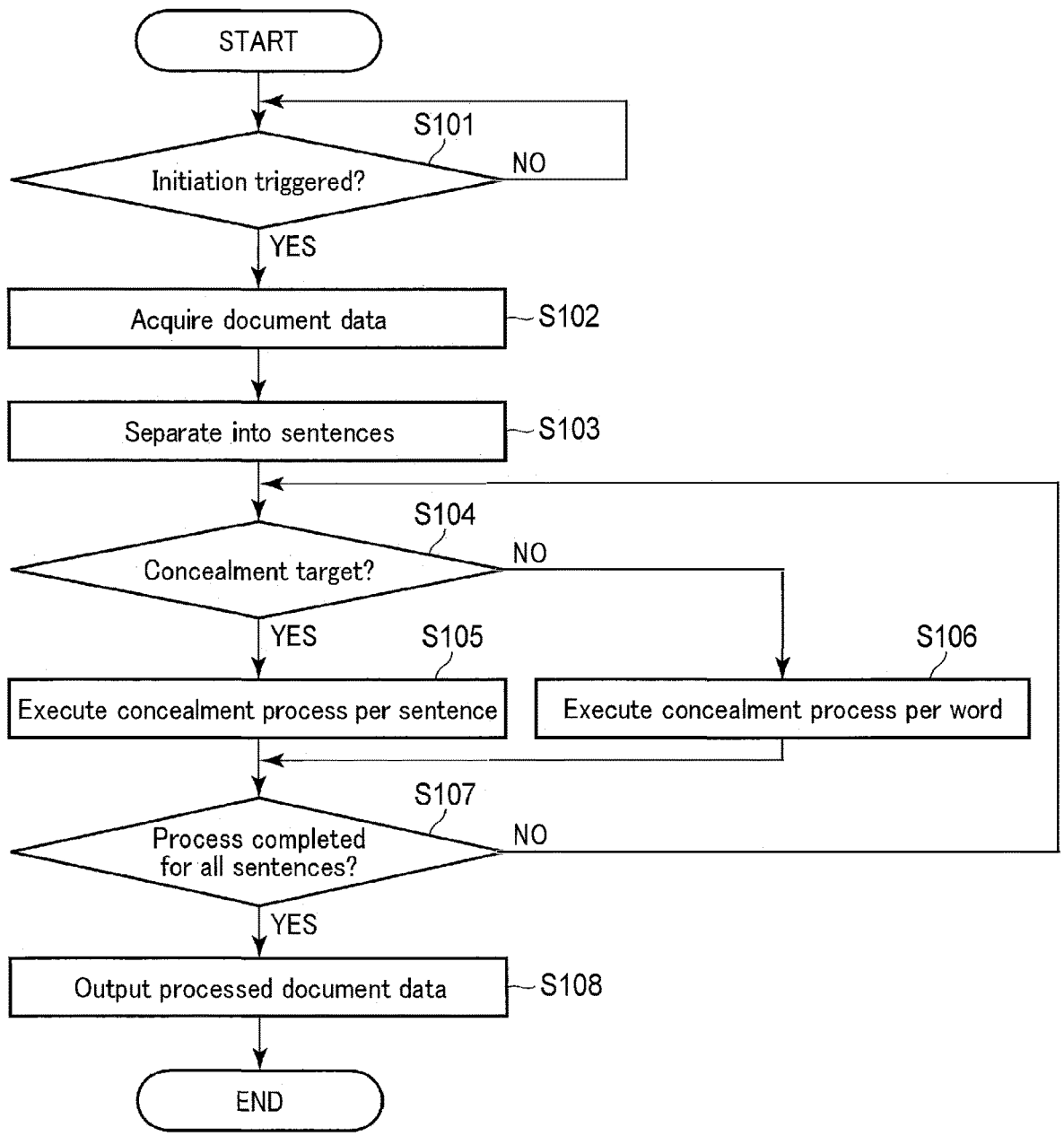
FIG. 4 is a flowchart showing the procedure and details of the process executed by the document processing apparatus of FIG. 3.

Next, the information processing operations of the document processing apparatus 1 configured as above to serve as an information processing apparatus will be described. FIG. 4 is a flowchart showing the procedure and details of the processing.

First of all, the document processing apparatus 1 acquires concealment rules at any timing in advance under the control of the concealment rule acquisition part 21, and stores the acquired concealment rules in the concealment rule memory 31. The document processing apparatus 1 may be configured to acquire the preset concealment rules from a server on the network via the communication interface 11 under the control of the concealment rule acquisition part 21, or to acquire the information stored in an external memory medium such as a USB memory or information input by the operator to the input device 3, as concealment rules, via the input/output interface 12.

At step S101, the document processing apparatus 1 first monitors the presence or absence of a trigger for initiating a concealment process under the control of the controller 20. In this state, for example if an operator inputs through the input device 3 an instruction of initiating a process, the document processing apparatus 1 executes the following operations upon receipt of the instruction as an initiation trigger.

At step S102, under the control of the controller 20, the document processing apparatus 1 acquires document data DD, which is the concealment processing target, from the voice information processing apparatus 2 or a user terminal UT via the communication interface 11, and stores the document data DD into the document data memory 32, at the document data acquisition part 22. The document processing apparatus 1 may acquire the processing target document data DD from a different server on the network. Alternatively, the document processing apparatus 1 may be configured to acquire, as the processing target document data DD, information stored in an external memory medium such as a USB memory or information input by the operator to the input device 3 via the input/output interface 12 under the control of the document data acquisition part 22.

Next, at step S103, under the control of the controller 20, the document processing apparatus 1 executes a process at the sentence separation part 23 of reading the document data DD from the document data memory 32, identifying the text contained in the document data DD and separating the text into sentences, which serve as units of determination, in accordance with the concealment rules stored in the concealment rule memory 31. According to the present embodiment, the concealment rules designate the punctuation symbol "○" as a sentence end marker, and the sentence separation part 23 executes a process of separating the text at every punctuation symbol "○". The sentence separation part 23 sequentially sends the sentences obtained by the separation to the concealment target determination part 24. If the text contained in the document data DD cannot be separated in accordance with the concealment rules, the sentence separation part 23 sends the unseparated text to the concealment target determination part 24 as a determination unit sentence.

At step S104, with respect to each sentence that serves as a unit of determination, the document processing apparatus 1 determines at the concealment target determination part 24 whether the sentence is a concealment target in accordance with the concealment rules stored in the concealment rule memory 31, under the control of the controller 20.

For the determination of a given sentence being a concealment target, various methods may be adopted. For instance, according to the embodiment, a dictionary with entries of keywords relating to the confidential information (concealment keywords) may be prepared in advance so that the number of concealment keywords in this dictionary contained in a given sentence can be determined. The dictionary may be stored in the concealment rule memory 31 as part of the concealment rules, or a memory for the dictionary may be provided in the data memory 30. Alternatively, the document processing apparatus 1 may create access to a dictionary database (not illustrated) constructed on a network NW via the communication interface 11 to acquire the concealment keywords.

Through use of the above dictionary with entries of concealment keywords, the concealment target determination part 24 may determine a given sentence to be a concealment target if a predetermined number or more of concealment keywords are contained in the sentence. Alternatively, the concealment target determination part 24 may determine a sentence to be a concealment target if concealment keywords are contained in the sentence in a predetermined ratio or higher with respect to the words of the sentence in total.

Examples of concealment keywords entered may include proper names such as names of individuals, titles, companies, places and products, or terms such as "profit chart", "management information", "personnel reshuffle", "promotion", "internal use only", and "confidential". The concealment target determination part 24 may determine a sentence to be a concealment target if the sentence contains at least one of the concealment keywords.

Alternatively, the concealment target determination part 24 may determine a sentence associated with a specific speaker to be a concealment target when the document data DD contains information relating to speakers (deliverers of utterances). For instance, on the document data DD2 generated using the user terminal UT, information that identifies a speaker (e.g., individual name, nickname, and ID) may be added to each sentence by a person who creates the document (e.g., meeting participant P). Furthermore, the use of a voice recognition engine, which adopts the aforementioned voice recognition AI to convert the voice information to text, may also enable information that identifies the speakers to be incorporated into the document data. If this is the case, the concealment target determination part 24 may determine sentences associated with specific speakers designated by the concealment rules, such as president, manager of the personnel department, and person in charge of engineering and development, to be concealment targets.

The concealment target determination part 24 may determine a given sentence to be a concealment target when an expression (words or phrases) that requires concealment is contained in the sentence. For instance, by entering such expressions in advance into the aforementioned dictionary, or with the assistance of the language analysis technique such as AI, the concealment target determination part 24 can identify sentences including words or phrases such as "keep this off-the-record", "this is off-topic . . . ", and "just between ourselves . . . ", and determine these sentences to be concealment targets. If this is the case, concealment rules may be formulated such that not only the sentence in question but also the predetermined number of sentences preceding or following this sentence will be determined as concealment targets. Furthermore, a group of sentences identified as the utterances of a given speaker may be determined to be a concealment target. Additionally, concealment rules may include phrases that represent the end of a concealment process, for example by determining a sentence including a phrase such as "what has been discussed up to here should not be disclosed outside" to be a process-ending condition.

Furthermore, the concealment rules may be formulated such that the concealment target determination part 24 further determines, in relation to the sentence determined to be a concealment target, the confidentiality level representing the degree of confidentiality of sentence content. For instance, the concealment target determination part 24 may determine the confidentiality level of each sentence in accordance with the concealment rules and add additional information to a sentence determined to have a high confidentiality level so that such a sentence can be differentiated from others.

When it is determined above at step S104 by the concealment target determination part 24 that the sentence is a concealment target, the process proceeds to step S105.

At step S105, the document processing apparatus 1 executes a concealment process at the concealment processing part 25 under the control of the controller 20 upon the sentence determined to be a concealment process target in accordance with the concealment rules.

For the concealment process, various schemes may be adopted. For instance, the concealment processing part 25 may execute a masking process to replace all the characters in the concealment process target sentence with specific symbols. Alternatively, the concealment processing part 25 may execute an encrypting process upon the concealment process target sentence, or delete the concealment process target sentence to make viewers unaware of its presence. The concealment process may be a recoverable or unrecoverable process in relation to the original sentence.

The concealment processing part 25 may execute different concealment processes in accordance with the concealment rules depending on the confidentiality levels determined by the concealment target determination part 24 to represent the degree of confidentiality. For instance, if a sentence contains a certain number or more of concealment target words entered into the dictionary, a high confidentiality level may be determined for it. Likewise, if a sentence contains a specific individual name or specific keyword, a high confidentiality level may be determined for it.

According to the present embodiment, the concealment rules may be configured such that the concealment processing part 25 will execute a concealment process using a small processing-load encryption scheme for a sentence of a low confidentiality level and a complex encryption scheme for a sentence of a high confidentiality level. Alternatively, the concealment rules may be configured such that the concealment processing part 25 will execute an unrecoverable concealment process on a sentence of a high confidentiality level, and a recoverable concealment process on a sentence of a low confidentiality level. The concealment rules may be configured such that the concealment processing part 25 executes a concealment process using different encryption keys depending on different confidentiality levels of the sentences. The text subjected to such a concealment process using different encryption keys is recoverable with decryption keys for which access authorization is vested or not vested depending on the individual viewers. With different numbers or kinds of decryption keys available for different viewers, a viewable range of a single file of the processed document data MD can be subject to different controls for different viewers.

After the concealment process executed at step S105, the document processing apparatus 1 proceeds to step S107.

On the other hand, when it is determined above at step S104 by the concealment target determination part 24 that the sentence is not a concealment target, the document processing apparatus 1 proceeds to step S106.

At step S106, the document processing apparatus 1 further determines at the concealment target determination part 24 whether each word of the sentence is a concealment process target, under the control of the controller 20. The concealment process target may be in a unit of a character, a symbol, a word, a phrase, a clause, or the like. When it is determined at step S106 by the concealment target determination part 24 that the word is a concealment process target, the document processing apparatus 1 executes a concealment process upon this word at the concealment processing part 25.

According to the present embodiment, a dictionary with entries of keywords relating to the confidential information (concealment keywords) may be prepared in advance so that the concealment processing part 25 can execute a concealment process upon a word of a sentence if this word indeed matches a concealment keyword contained in the dictionary. This dictionary may be either the same as, or different from, the dictionary used at step S104 to determine whether or not a sentence is a concealment target. In the same manner as at step S105, the concealment process may be executed through various methods. Alternatively, step S106 may be omitted.

When no concealment keyword is contained in the sentence at step S106, the document processing apparatus 1 proceeds to step S107, without the execution of a concealment process.

At step S107, the document processing apparatus 1 determines whether or not the process is completed for all the sentences in the target document data DD, under the control of the controller 20. If an unprocessed sentence is contained, the document processing apparatus 1 returns to step S104 to repeat the determination of a concealment target and execution of the concealment process at step S105 or S106. When it is determined at step S107 that the process is completed on all the sentences, the document processing apparatus 1 proceeds to step S108.

At step S108, the document processing apparatus 1 generates processed document data MD using the information obtained after the concealment process at the concealment processing part 25, and outputs the processed document data MD at the output control part 26, under the control of the controller 20. According to the present embodiment, the document processing apparatus 1 combines the separate sentences either subjected or not subjected to the concealment process in a suitable order at the output control part 26 so as to generate and output the processed document data MD. When combining the separate sentences, the output control part 26 may perform the combination to result in either the same arrangement or layout of the original document data DD, or in a different arrangement or layout.

Effects

As discussed above, according to an aspect of the present invention, the document processing apparatus 1 for processing document data DD includes a document data acquisition part 22 configured to acquire the document data DD including sentences that contain character information; a sentence separation part 23 configured to separate the document data DD into sentences; a concealment target determination part 24 configured to determine, in accordance with the preset concealment rules, whether or not each of the sentences obtained by the separation and included in the document data DD is a concealment target; a concealment processing part 25 configured to execute, when a sentence is determined to be a concealment target, a concealment process upon the sentence; and an output part configured to output processed document data MD that contains the sentence subjected to the concealment process by the concealment processing part 25. In addition, with respect to a sentence determined not to be a concealment target, the concealment target determination part 24 is configured to determine whether each word of the sentence is a concealment target, and the concealment processing part 25 is configured to execute a concealment process suitable for a word unit upon the word determined to be a concealment target.

In this manner, based on the document data DD1 of meeting minutes automatically created from voice data using voice recognition techniques or document data DD2 created by a meeting participant P using a user terminal UT, processed document data MD suitable for disclosure, sharing, or distribution can be readily generated and output by executing a concealment process suitable for a sentence unit upon a concealment process target sentence; while either conducting a concealment in units of words or maintaining the original character information for a sentence that is not a concealment process target.

The document processing apparatus 1 is configured to further determine whether or not a sentence is a concealment target by determining whether the sentence contains concealment target words of a certain number or more, or contains those in a certain ratio or higher, whether the sentence contains an expression that needs to be concealed, or whether the sentence is associated with a specific speaker, in accordance with the concealment rules. By formulating suitable concealment rules, processed document data MD subjected to a concealment process and prepared for disclosure can be suitably and readily attained without the need to perform a complicated linguistic and grammatical analysis.

Furthermore, by suitably formulating the concealment rules, concealment processes that vary in accordance with the confidentiality level of each sentence can be conducted. In this manner, a concealment process having a suitable processing load and processing time for the degree of confidentiality of each sentence can be selected, thereby making it possible to reduce processing costs for document processing.

In addition, in accordance with the concealment rules that are formulated, a concealment process can be executed by which the original sentence can be recovered through use of keys differing in accordance with confidentiality levels. This facilitates the control of a disclosure range of a single file of processed document data MD for individual viewers via control of the access authorization and distribution of the keys. For instance, the keys for decryption may be kept in a file sharing area to which access authorization differs depending on the division to which a viewer belongs or his/her title so that different disclosure levels can be realized for a single file of the processed document data MD subjected to different levels of concealment processes.

Meeting minutes may need to be promptly disclosed to viewers such as company employees and relevant collaborators. The meeting minutes, however, may contain matters that should be disclosed only to a certain group of viewers. Although voice recognition has helped significantly develop a technique of automatically creating meeting minutes, not all the conversation being texted and distributed as a document may be desired. Moreover, a certain level of disclosure of matters for a certain viewer group of viewers but a lower level of disclosure for a different viewer group may be intended. This would require different masking processes for different viewers, which can be a highly cumbersome task when performed manually.

The document processing apparatus 1 according to the present embodiment is configured to generate processed document data MD corresponding to each viewer group with a simple operation by adopting concealment rules suitable for each viewer group if document data of meeting minutes need to be shared. For instance, different concealment rules may be formulated for a viewer group consisting of executives of a company, workers of the same division, workers of different divisions, or outsiders so that the processed document data MD can be readily prepared with different disclosure levels from the same document data DD.

The document processing apparatus 1 according to the present embodiment is configured to execute different concealment processes in a manner such that sentences can be recovered with different decryption keys in accordance with different confidentiality levels of the sentences. Thus, when distributing data by emails, it is not necessary to send different documents to different viewer groups. Even with a single document, different disclosure ranges can be realized for different viewers.

Furthermore, concealment rules may be formulated in advance such that a masking process can be executed in response to specific keywords (voice commands) such as "this should be off the record". Thus, the meeting participants P can deliver free discussion using such voice commands without harboring concerns about all conversations being entered into, and shared on, the meeting minutes.

That is, according to the present embodiment, processed document data MD having different disclosure ranges in accordance with viewers or viewer groups can be easily created with a simple operation, for example, in the situation where everything should be disclosed to managers and those with higher-level titles but a certain portion should be masked to other workers, or when everything should be disclosed to meeting attendances but only a certain portion to those who did not attend the meeting.

Other Embodiments

The present invention is not limited to the above embodiments.

The document processing apparatus 1 may be provided with the function of the voice information processing apparatus 2. Alternatively, the functions of the document processing apparatus 1 may be distributed to multiple devices so that these devices can execute the process via mutual cooperation.

The determination and concealment processes by the document processing apparatus 1 need not always be executed in sentence units. The determination and concealment processes may be executed freely in units of characters, words, symbols, character strings, sections, and headings. Similarly, concealment rules may be formulated in a manner such that separation may be made at a punctuation symbol "、" or comma "," in addition to the punctuation symbol "。" and period ".".

If a document contains image data such as a chart, an illustration, and a snapshot, such image data may be determined to be a unit of the concealment process in addition to the character information. If this is the case, the concealment rules may be formulated such that all the image data should be masked, the image data determined as a result of image analysis to include a specific image should be masked, or image data associated with a specific keyword should be masked.

In the above explanation of the present embodiment, the determination of a concealment process target is conducted first for each sentence. The document processing apparatus 1, however, may be configured to execute a masking process upon all the keywords in the document data DD based on the dictionary having keyword entries prior to the determination and concealment processes in units of sentences. The document processing apparatus 1 may be configured to further determine a concealment process target per unit of sentence or paragraph, and to mask or encrypt the entire sentence or paragraph if each unit contains masked keywords of a certain number or more or in a certain ratio or higher.

The dictionary and concealment rules may be trained or updated through machine learning. For instance, a set of attributes of a meeting (e.g., subject of the meeting, time and date, place, attributes of meeting attendants, number of attendances) and entries of concealment keywords may be used as training data to construct a neural network model that can output concealment keywords in response to input of attributes of a meeting. A masking process manually added to the processed document data MD may be incorporated into the training so as to update the concealment rules. For instance, phrases that a speaker desires to conceal, privacy- or harassment-related terms or contexts, possibly copyright- or portrait right-related information, may be incorporated into the training.

The document processing apparatus 1 may, instead of using a dictionary or concealment rules, be configured to process document data by using a neural network or statistical model, trained based on the training data including the attributes of a meeting and the processing results for concealing or not concealing specific words or sentences.

The concealment process may be a timed process. For instance, the document data may contain information that needs to be temporarily secreted but may be disclosed after a certain period of time elapses, such as technical matters before the filing of a patent application and corporate information of business alliance candidates. If this is the case, a timed encryption process that enables recovery only after a certain period of time elapses may be adopted as a concealment process. Alternatively, a timed masking process, which removes masking after a certain period of time elapses, may be adopted as a concealment process. With such a timed concealment process adopted in the document processing apparatus 1, document data suitably subjected to the concealment process can be obtained for a document intended for disclosure after a certain period of time elapses, without the need to separately distribute a decryption key or a disclosure document after this certain period of time.

If the document data DD before the processing contains speaker identification information with which a speaker can be identified, this speaker identification information may be maintained in the processed document data MD. For sentences upon which the concealment process has been executed, the speaker identification information may be concealed, or only the speaker identification information maintained.

In this manner, for instance when the processed document data MD is reproduced, the sentence can be reproduced in a voice which is synthesized based on the voice information of the speaker with the assistance of the voice information processing apparatus 2, in accordance with the speaker identification information. That is, based on the processed document data MD in which the confidential information is masked, a reconstruction of the meeting atmosphere can be offered to the viewers.

Furthermore, if the original document data DD contains the speaker information, a group of keywords may be associated with individual speakers, or different concealment rules may be formulated for individual speakers.

The formats for outputting the processed document data MD can be modified in various manners within the scope of the present invention.

That is, the present invention should not be limited to the above-described embodiments but may be modified without departing from the scope of the invention at the implementation stage. Each embodiment may be implemented in a suitable combination with others. If this is the case, combined effects can be attained. The above embodiments contain various inventions, and various inventions can be extracted from combinations of selected ones of the disclosed structural components. For instance, if the issue of the invention can be solved and effects can be attained even by omitting some of the entire structural components illustrated in the embodiments, the structure with these components omitted may be extracted as an invention.

REFERENCE SIGNS LIST

1 Document processing apparatus
2 Voice information processing apparatus
3 Input device
4 Display device
11 Communication interface
12 Input/output interface
20 Controller
20A Hardware processor
20B Program memory
21 Concealment rule acquisition part
22 Document data acquisition part
23 Sentence separation part
24 Concealment target determination part
25 Concealment processing part
26 Output control part
30 Data memory
31 Concealment rule memory
32 Document data memory
50 Bus

The invention claimed is:

1. An information processing apparatus comprising:
processing circuitry configured to
store a plurality of preset rules;
implement a voice recognition engine that converts voice information into text information;
acquire first document data, which is text information converted from voice information by the voice recognition engine, including sentences that contain character information;
separate the first document data into sentences;
determine whether or not each of the sentences included in the first document data is a concealment target, in accordance with at least one of the plurality of preset rules;
execute a concealment process upon the sentence when the sentence is determined to be a concealment target; and
output second document data including a sentence obtained by executing the concealment process at executing the concealment process,
wherein the plurality of preset rules includes at least (i) a first preset rule that indicates that a sentence associated with a specific speaker is a concealment target, such that the voice recognition engine is configured to identify the specific speaker from the voice information and incorporate information identifying the specific speaker into the first document data, and when the first document data includes the information identifying the specific speaker and a sentence is uttered by the specific speaker, the processing circuitry determines the sentence uttered by the specific speaker to be a concealment target, and (ii) a second preset rule that indicates that a sentence is a concealment target when the sentence contains concealment target words in a predetermined ratio or higher with respect to the words of the sentence in total,
wherein
the processing circuitry further determines, when the sentence is determined to not be a concealment target, whether or not a word contained in the sentence is a concealment target, and executes a concealment process upon the word contained in the sentence if the word is a concealment target.

2. The information processing apparatus according to claim 1, wherein
when a sentence contains an expression that indicates a need for concealment, the processing circuitry determines sequential sentences including the sentence to be a concealment target according to a third preset rule that is stored among the plurality of present rules, the sequential sentences being identified as an utterance of a speaker of the sentence.

3. The information processing apparatus according to claim 1, wherein
the processing circuitry determines, in accordance with the preset rules, a confidentiality level representing a degree of confidentiality for each of the sentences obtained by separating the first document data, and
the processing circuitry executes a concealment process upon each of the sentences in accordance with the confidentiality level determined by the concealment target determination part, the concealment process differing in accordance with the confidentiality level.

4. The information processing apparatus according to claim 3, wherein
the processing circuitry executes a concealment process that enables recovery for an original sentence, using keys for each of the sentences, the keys differing in accordance with the confidentiality level.

5. The information processing apparatus according to claim 1, wherein
the processing circuitry executes a timed concealment process upon the sentence determined to be a concealment target.

6. An information processing method implemented by processing circuitry of an information processing apparatus, the method comprising:
- storing a plurality of preset rules;
- implementing a voice recognition engine that converts voice information into text information;
- acquiring first document data, which is text information converted from voice information by the voice recognition engine, including sentences that contain character information;
- separating the first document data into sentences;
- determining whether or not each of the sentences included in the first document data is a concealment target, in accordance with at least one of the plurality of preset rules;
- executing a concealment process upon the sentence when the sentence is determined to be a concealment target;
- outputting second document data including a sentence obtained by executing the concealment process at executing the concealment process, and
- wherein the plurality of preset rules includes at least (i) a first preset rule that indicates that a sentence associated with a specific speaker is a concealment target, such that the voice recognition engine is configured to identify the specific speaker from the voice information and incorporate information identifying the specific speaker into the first document data, and when the first document data includes the information identifying the specific speaker and a sentence is uttered by the specific speaker, the method includes determining the sentence uttered by the specific speaker to be a concealment target, and (ii) a second preset rule that indicates that a sentence is a concealment target when the sentence contains concealment target words in a predetermined ratio or higher with respect to the words of the sentence in total,
- wherein the method further includes
- determining, when the sentence is determined to not be a concealment target, whether or not a word contained in the sentence is a concealment target, and executing a concealment process upon the word contained in the sentence if the word is a concealment target.

7. A non-transitory computer readable medium storing a computer program which is executed by a computer to execute a method comprising:
- storing a plurality of preset rules;
- implementing a voice recognition engine that converts voice information into text information;
- acquiring first document data, which is text information converted from voice information by the voice recognition engine, including sentences that contain character information;
- separating the first document data into sentences;
- determining whether or not each of the sentences included in the first document data is a concealment target, in accordance with at least one of the plurality of preset rules;
- executing a concealment process upon the sentence when the sentence is determined to be a concealment target;
- outputting second document data including a sentence obtained by executing the concealment process at executing the concealment process, and
- wherein the plurality of preset rules includes at least (i) a first preset rule that indicates that a sentence associated with a specific speaker is a concealment target, such that the voice recognition engine is configured to identify the specific speaker from the voice information and incorporate information identifying the specific speaker into the first document data, and when the first document data includes the information identifying the specific speaker and a sentence is uttered by the specific speaker, the method includes determining the sentence uttered by the specific speaker to be a concealment target, and (ii) a second preset rule that indicates that a sentence is a concealment target when the sentence contains concealment target words of in a predetermined ratio or higher with respect to the words of the sentence in total,
- wherein the method further includes
- determining, when the sentence is determined to not be a concealment target, whether or not a word contained in the sentence is a concealment target, and executing a concealment process upon the word contained in the sentence if the word is a concealment target.

* * * * *